United States Patent
Lyall, III

[11] Patent Number: 6,059,321
[45] Date of Patent: May 9, 2000

[54] GRIP COUPLING FOR JOINING CONDUIT

[75] Inventor: Lucian H. Lyall, III, Anaheim Hills, Calif.

[73] Assignee: Group Timerline, Inc., Kingwood, Tex.

[21] Appl. No.: 09/130,691

[22] Filed: Aug. 6, 1998

[51] Int. Cl.[7] .................................................. F16L 35/00
[52] U.S. Cl. ................................ 285/24; 285/31; 285/39; 285/40; 285/139.1; 285/139.2; 285/139.3; 285/141.1; 285/148.19; 285/302; 285/423; 285/906; 72/367.1; 72/370.16; 29/525
[58] Field of Search .................................. 295/24, 27, 31, 295/39, 40, 139.1, 139.2, 139.3, 141.1, 148.19, 302, 423, 906, 374; 29/525; 72/367.1, 370.16, 304

[56] References Cited

U.S. PATENT DOCUMENTS

| | | | |
|---|---|---|---|
| 1,065,387 | 6/1913 | Ogg | 285/27 |
| 1,762,766 | 6/1930 | Garay | 285/374 X |
| 2,580,818 | 1/1952 | Mundy et al. | 285/40 |
| 3,984,132 | 10/1976 | Sarson | 285/222 |
| 4,030,742 | 6/1977 | Eidelberg et al. | 285/343 |
| 4,054,305 | 10/1977 | Gajajive | 285/40 X |
| 4,079,966 | 3/1978 | Berry et al. | 285/24 |
| 4,547,004 | 10/1985 | Goldberg | 285/31 |
| 4,674,775 | 6/1987 | Tajima et al. | 285/330 |
| 4,770,560 | 9/1988 | Ott | 403/296 |
| 5,169,179 | 12/1992 | Teel et al. | 285/40 |
| 5,215,336 | 6/1993 | Worthing | 285/81 |
| 5,220,419 | 5/1996 | DeBoalt et al. | 285/24 |
| 5,405,340 | 4/1995 | Fageol et al. | 604/283 |
| 5,439,258 | 8/1995 | Yates | 285/313 |
| 5,439,259 | 8/1995 | Taga et al. | 285/334.5 |
| 5,519,273 | 5/1996 | Keck | 310/71 |
| 5,562,313 | 10/1996 | Piniaev et al. | 285/373 |
| 5,562,482 | 10/1996 | Wright | 439/429 |
| 5,709,417 | 1/1998 | Verbeck | 285/24 |

FOREIGN PATENT DOCUMENTS

| | | | |
|---|---|---|---|
| 14374 | 6/1910 | United Kingdom | 285/24 |
| 1143668 | 2/1969 | United Kingdom | 285/24 |

*Primary Examiner*—Dave W. Arola
*Attorney, Agent, or Firm*—Gregory M. Howison; Mark W. Handley

[57] ABSTRACT

A fitting is provided for joining to a smooth exterior periphery of a tubular conduit with a seal member sealing therebetween. The fitting has a tubular body with a central passage for receiving the tubular conduit. The central passage defines a central axis for the fitting and has a tapered opening, a threaded section, a seal section and a stop which circumferentially extend coaxially about the central axis. An annular shaped seal member extends from the seal section for sealingly engaging the exterior periphery of the tubular conduit. The tapered opening of the fitting provides an entrance to the central passage which is sized for receiving and end of the tubular conduit having an oval shaped periphery, and then rounding the exterior periphery such that annular shaped seal member will sealingly engage the exterior of the tubular conduit. The seal section is disposed between the tapered opening and the threaded section of the central passage. The threaded section is inwardly tapered and has thread crests which extend with edges for scoring the exterior periphery of the tubular conduit such that the threads will grippingly engage within the tubular conduit and pull the tubular conduit further within the central passage when the fitting is rotated in a first angular direction.

20 Claims, 7 Drawing Sheets

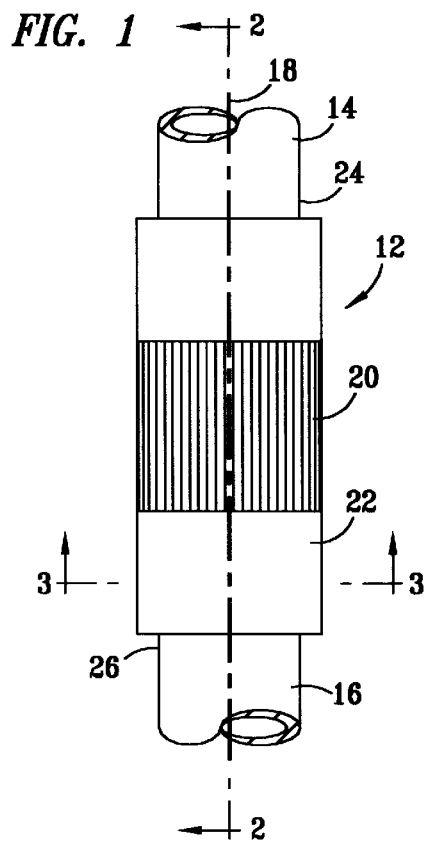
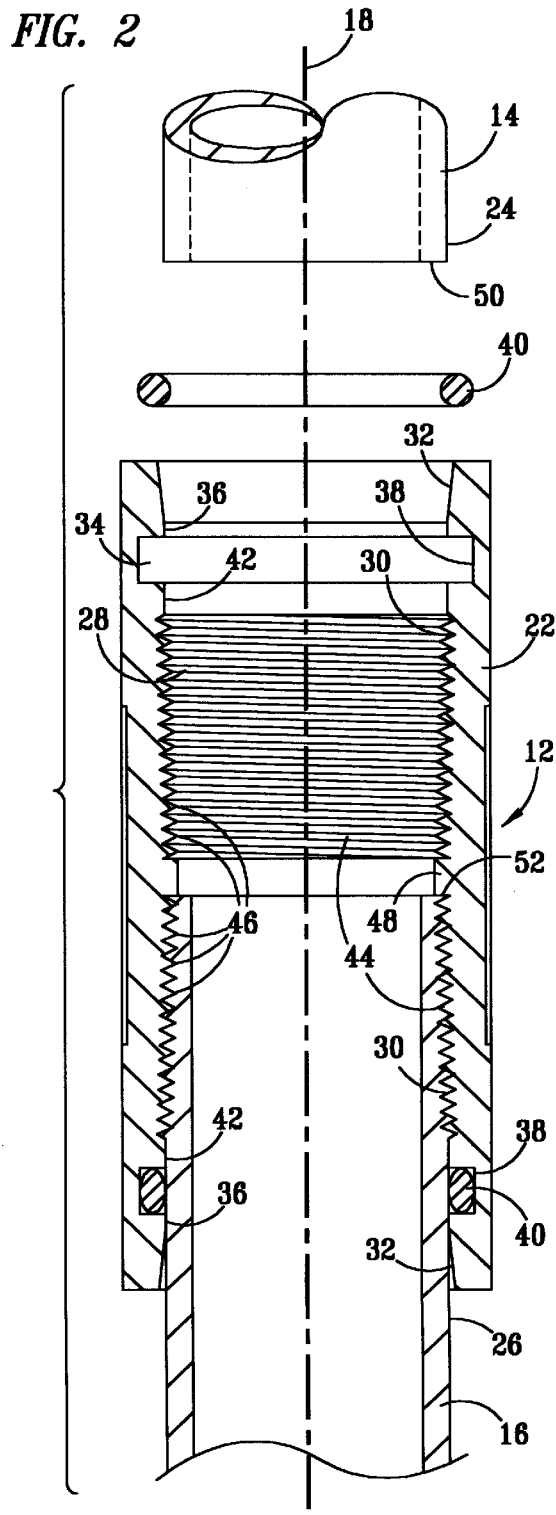
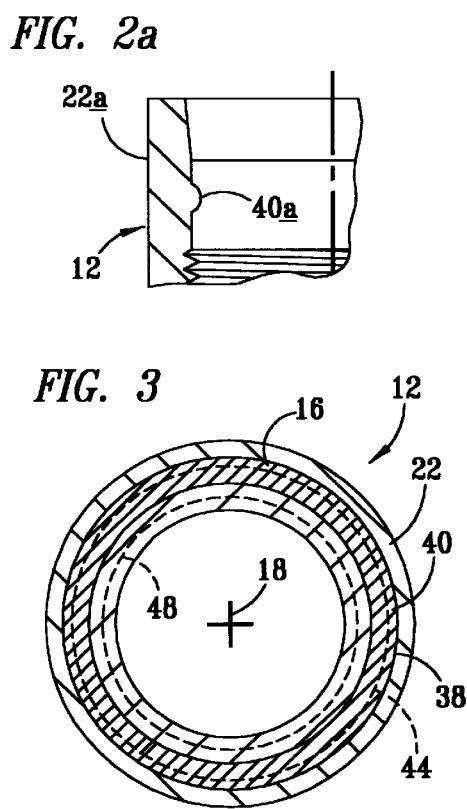
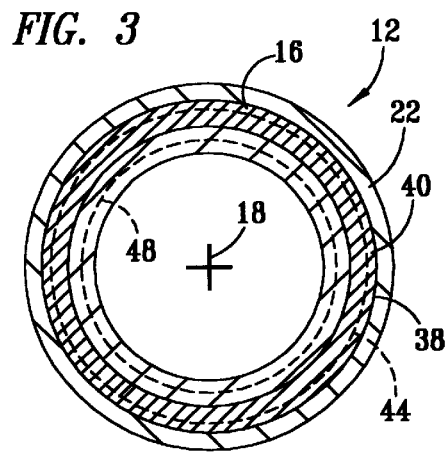

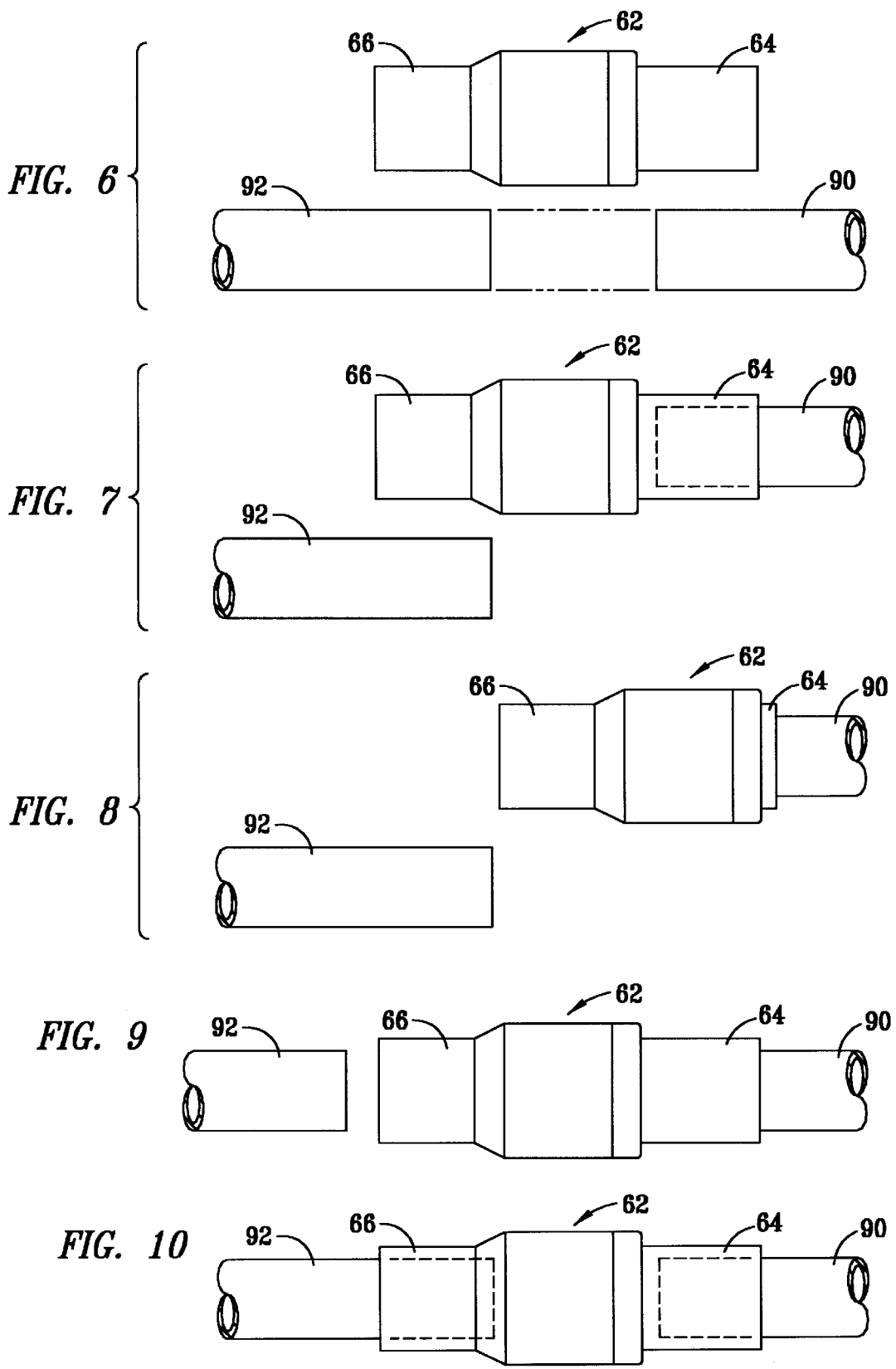

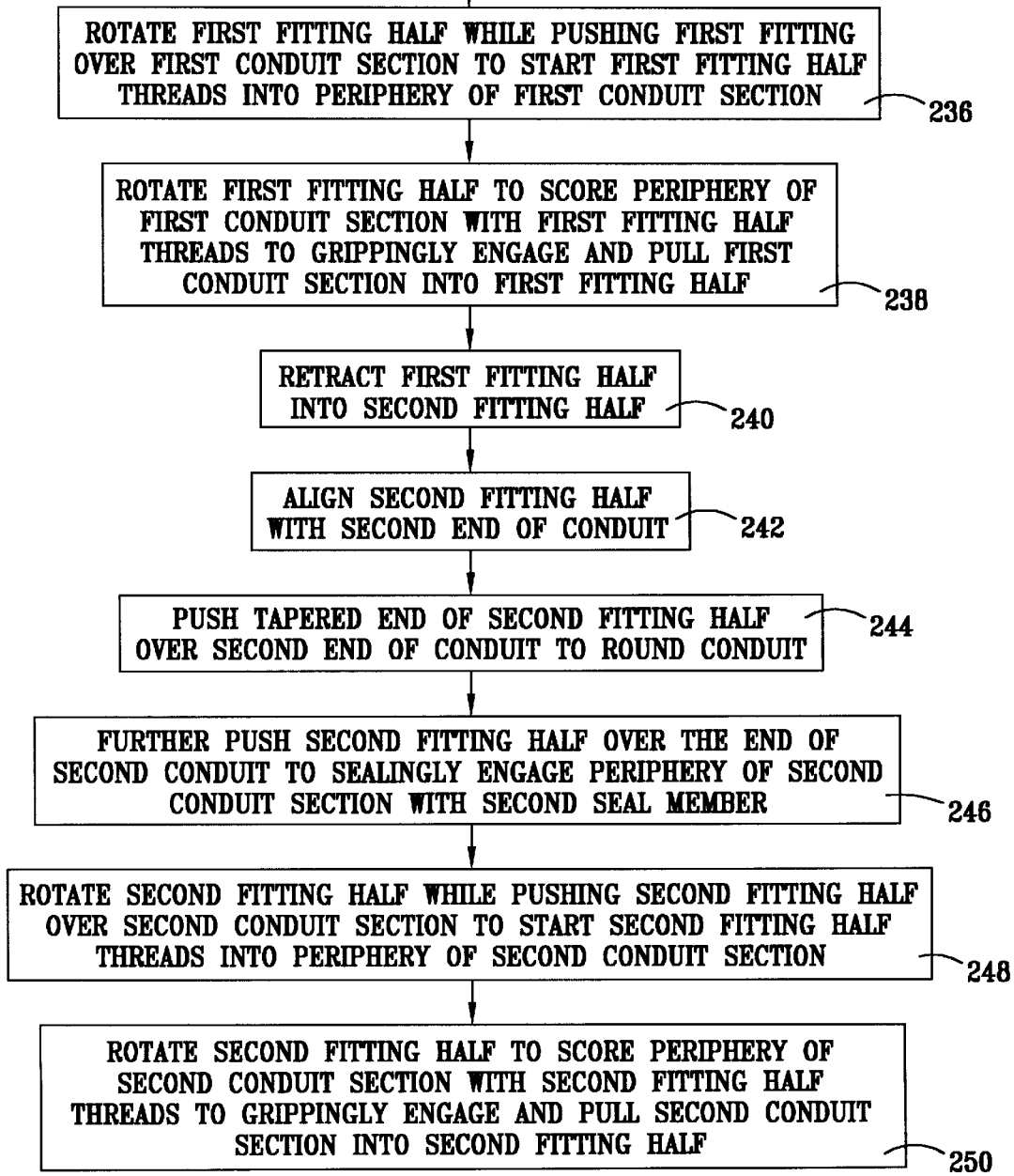

GRIP COUPLING FOR JOINING CONDUIT

TECHNICAL FIELD OF THE INVENTION

The present invention relates in general to connectors for tubular conduits, and in particular to fittings for mounting on the ends of conduit.

BACKGROUND OF THE INVENTION

Prior art connectors and fittings have been utilized for joining to tubular conduits for connecting the tubular conduits to other members. The tubular conduits have included electrical conduits, piping, ducting and the like, which have been used for both fluid flow conduits and to provide protective enclosures for electrical power and telecommunication cables. For power and telecommunication cable installations which are buried or located in hazardous environments, a fluid tight seal is provided between the fittings and the mating ends of the tubular conduits. Recently, tubular conduits made of polyethylene have been provided for running telecommunication cables, such as fiber optic cables. In the prior art, fittings have been typically joined to the terminal ends of sections of such tubular conduits by either adhesive bonding, swedging or securing two mating threads together. Adhesively securing a fitting to a conduit end requires preparation to clean the surface of the conduit end for bonding to the adhesive, which is labor intensive. A swedged fitting requires two swedging members between which a terminal end section of a tubular conduit is squeezed. One of the swedging members is placed on the interior of the tubular conduit which results in a restriction which is smaller than the interior diameter of the tubular conduit, rather than providing a full bore opening. Swedging may also cause problems with tubular conduits made of polyethylene since polyethylene is subject to creep under pressure, causing the polyethylene material to cold flow and weaken the grip of the swedging members upon the tubular conduit. A threaded connection requires the threading of either an interior surface or an exterior surface of the tubular conduit, which is time consuming and labor intensive.

SUMMARY OF THE INVENTION

The present invention disclosed and claimed herein comprises a fitting for joining to a smooth exterior periphery of a tubular conduit with a seal member sealing therebetween. The fitting has a tubular body with a central passage for receiving the tubular conduit. The central passage defines a central axis for the fitting and has a tapered opening, a threaded section, a seal section and a stop which circumferentially extend coaxially about the central axis. An annular shaped seal member extends from the seal section for sealingly engaging the exterior periphery of the tubular conduit. The tapered opening of the fitting provides an entrance to the central passage which is sized for receiving an end of the tubular conduit having an oval shaped exterior periphery, and then rounding the exterior periphery of the tubular conduit such that annular shaped seal member will sealingly engage the exterior periphery of the tubular conduit. The seal section is disposed between the tapered opening and the threaded section of the central passage. The threaded section is inwardly tapered and has thread crests which extend with edges for scoring the exterior periphery of the tubular conduit such that the threads will grippingly engage within the tubular conduit and pull the tubular conduit further within the central passage when the fitting is rotated in a first angular direction.

In another aspect of the present invention, a coupler fitting comprises first and second fitting halves. The first fitting half includes the above-described central passage which has a tapered opening, the threaded section and the seal section. The second fitting half includes a second portion of the central passage which defines a second tapered opening, a second threaded section, a second seal section and a second stop. A second seal member extends from the second seal section for sealingly engaging against the periphery of a second conduit. The second threaded section has threads of an opposite-hand to that of the threaded section of the first fitting half, such that two oppositely facing ends of two separate conduits will be drawn into the fitting in opposite lineal directions with rotation of the fitting in the first angular direction about the central axis.

In yet another aspect of the present invention, a telescoping fitting is provided which comprises first and second fitting halves. The first fitting half includes the tapered opening, the threaded section, the seal section, the stop and the seal member. The second fitting half includes a second tapered opening, a second threaded section, a second seal section, a second stop and a second seal member which circumferentially extend coaxially about the central axis, spaced apart from the first fitting half for receiving a second tubular conduit which faces in an opposite direction to that of the tubular conduit for fitting in the first fitting half. The second fitting half is lineally extensible such that it telescopes from within the first fitting half, and the first fitting half is rotatable relative to the second fitting half. A seal is provided for sealingly engaging between the first and second fitting halves.

In a further aspect of the present invention, the fitting comprises a bulkhead fitting half having an annular flange portion which laterally extends from the fitting with a seal face for pressing against a bulkhead wall. A gland nut is provided for threadingly securing to the end of the tubular body and squeezing a seal member between the seal face of the annular flange and the bulkhead wall.

BRIEF DESCRIPTION OF THE DRAWINGS

For a more complete understanding of the present invention and the advantages thereof, reference is now made to the following description taken in conjunction with the accompanying Drawings in which:

FIG. 1 is a side view of a grip coupling fitting for joining the ends of two tubular conduits;

FIG. 2 is a partially exploded, longitudinal section view of the grip coupling fitting, taken along Section Line 2—2 of FIG. 1;

FIG. 3 is a cross-sectional view of the grip coupling fitting, taken along Section Line 3—3 of FIG. 1;

FIGS. 6 through 10 are schematic diagrams depicting a method for repairing a damaged section of tubular conduit utilizing the telescoping grip coupling fitting;

FIGS. 14A and 14B are flow charts which together depict a method for utilizing the telescopically extensible grip coupling fitting.

DETAILED DESCRIPTION OF THE INVENTION

Figure 4:
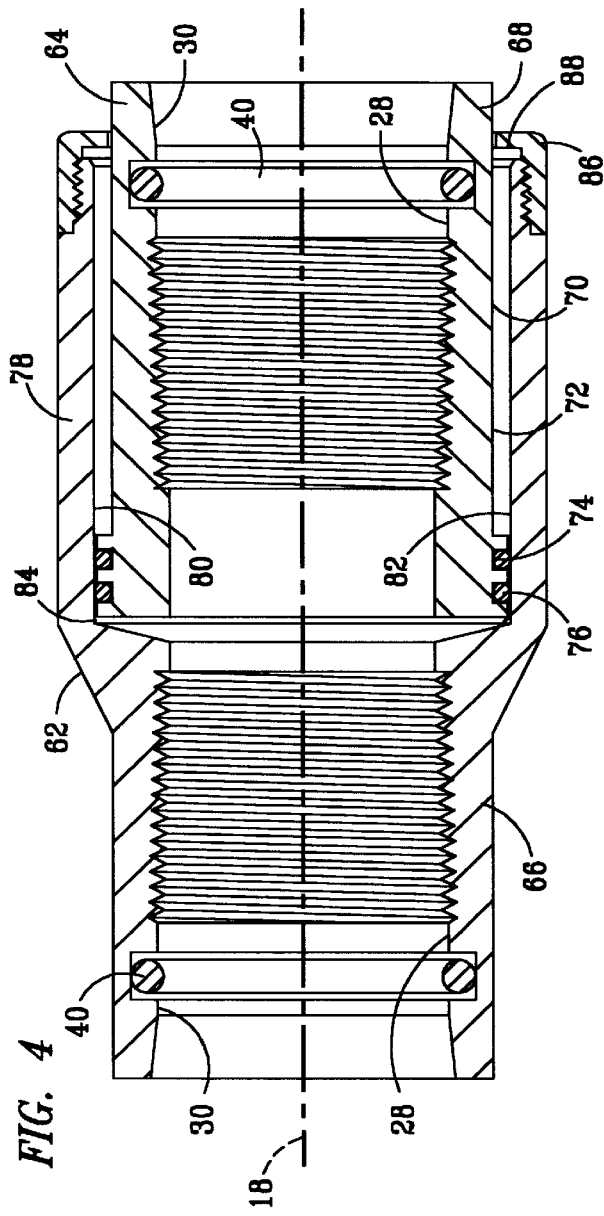
FIG. 4 is a longitudinal section view of a telescopically extensible grip coupling fitting having first and second coupling halves, with the first coupling half being telescopically extensible from within the second coupling half for joining two tubular conduit ends.

Referring now to FIG. 1, there is illustrated a side view of a grip coupling fitting 12 for joining to a tubular conduit 14 and a tubular conduit 16. The fitting 12 is preferably injection molded of a thermoplastic polymer, such as a polyamide with five to forty percent, by weight, glass fill. The tubular conduits 14 and 16 are preferably made of polyethylene, ranging in size from one-half inch to six inches in diameter. The fitting 12, the tubular conduit 14 and the tubular conduit 16 are coaxially aligned along a central axis 18. The fitting 12 has a roughened exterior peripheral grip surface 20, which is either knurled or has slots formed into the surface of the tubular body 22 of the fitting 12. In the preferred embodiment, the slots of the grip surface 20 are spaced apart in a circumferential arrangement which coaxially extends around the central axis 18 with the slots extending parallel to the central axis 18. The grip surface 20 provides a surface to which tooling may be secured to the exterior surface of the fitting 12 for rotating the fitting 12. In other embodiments, the grip surface 20 may be provided by protuberant ribs which extend outward from the exterior surface of the fitting 12 in a longitudinal direction which is parallel to the central axis 18, such that the protuberant ribs are circumferentially spaced apart around the longitudinal axis 18, as shown for the slots of the grip surface 20. The tubular conduits 14 and 16 have smooth exterior peripheries 24 and 26, respectively.

Referring now to FIG. 2, there is illustrated a longitudinal section view of the fitting 12, taken along section line 2—2 of FIG. 1. The peripheries 24 and 26 of respective ones of the tubular conduits 14 and 16 circumferentially extend in coaxial alignment with the central axis 18. The fitting 12 has a central passage 28 having a two profiles 30 which define two oppositely facing halves of the fitting 12. The two oppositely facing halves of the fitting 12 are rigidly secured together, being integrally formed of the thermoplastic polymer as a singular member. The profiles 30 each include a tapered entrance section 32, a seal section 34 and a threaded section 44. The two tapered entrance sections 32 are formed on opposite entrances to the central passage 28, and inwardly taper such that they narrow in an inward direction at an angle which is ten degrees from being parallel with the central axis 18. The tapered entrance sections 32 have outward end portions which are sized for receiving the ends of the tubular conduits 14 and 16 which are out of round, such as those having diametrical ovalities up to seven percent. Each of the seal sections 34 include an outwardly disposed annular shaped flat 36, a seal gland 38, which is provided by a groove, and a seal member 40 which extends from the respective one of the seal sections 34. The seal members 40 are preferably provided by seventy durometer nitrile O-rings which are disposed within respective ones of the seal glands 38. In other embodiments, the seal members 40 may be integrally formed as single members with the tubular body 22 of the fitting 12, such as a circumferentially extending annular protuberance or rib. The seal sections 34 further each include an inwardly disposed annular shaped flat 42. Pressing the tubular conduits 14 and 16 across the tapered entrance sections 32 will round the tubular conduits 24 and 26 of the tubular conduits 14 and 16 such that the seal members 40 will sealingly engage respective ones of the peripheries 24 and 26. Preferably, the seal glands 38 and the seal members 40 are sized such that the seal members 40 will seal against a pressure differential of one-hundred pounds per square inch.

The threaded sections 44 of the two halves of the fitting 12 have threads which are inwardly tapered, such that they narrow as they extend inward within the central passage 28. The threads of the sections 44 have crests 46. The two profiles 30 of the central passage 28 preferably include a stop 48 for engaging the terminal ends 50 and 52 of respective ones of the tubular conduits 14 and 16. In some embodiments, the inward tapers of the threaded sections 44 may provide a stop means for limiting the distance which the tubular conduits 14 and 16 may be pulled into the central passage 28 of the fitting 12, rather than requiring a stop 48. Preferably, the threaded sections 44 are provided by right-hand threads on one end of the fitting 12, and left-hand threads on the other end of the fitting 12, with the threads being standard sixty degree threads formed at ten threads per inch. The threaded sections 44 each taper inwardly to narrow in an inward direction into the central passage 28 of the fitting 12, tapering two and one-half degrees on the major diameter of the threads. The exterior peripheries 24 and 26 of respective ones of the tubular conduits 15 and 16 are preferably smooth to the terminal ends 50 and 52 prior to insertion into the fitting 12. The crests 46 of the threaded sections 44 engage the smooth exterior peripheries 24 and 26 of the fitting 12, scoring the peripheries 24 and 26 to form grooves into the peripheries 24 and 26 in which the crests 46 grippingly engage the end sections of the tubular conduits 14 and 16 to pull the tubular conduits 14 and 16 into the fitting 12. The fitting 12 is rotated in a first angular direction about the central axis 18 to pull both of the tubular conduits 14 and 16 into the central passage 28 in opposite lineal directions. Preferably, rotation of the fitting 12 with a right hand angular direction will advance the tubular conduits 14 and 16 inward within the fitting 12.

Referring now to FIG. 3, there is illustrated a cross-sectional view of the fitting 12 and the tubular conduit 16, taken along section line 3—3 of FIG. 1. The tubular body 22 of fitting 12, the tubular conduit 16, the seal gland 38, the seal member 40 and the annular shaped stop 48 are coaxially disposed with and circumferentially extend around the central axis 18. The seal member 40 extends from within the seal gland 38 for fitting against the smooth exterior of the tubular conduit 16. The threaded sections 44 each have threads which extend into the tubular conduit 16 to grippingly engage the tubular conduit 16 and prevent removal of the conduit 16 from within the fitting 12.

Referring now to FIG. 4, there is illustrated a longitudinal section view of a telescopically extensible grip coupling fitting 62. The fitting 62 has a first fitting half 64 and a second fitting half 66. The first fitting half 64 telescopically extends from within the second fitting half 66. The first fitting half 64 has a tubular body 68 with an exterior profile 70 having a reduced diameter portion 72 and an enlarged diametrical portion which includes two seal glands 74 for receiving two seal members 76, which are preferably provided by seventy durometer nitrile O-rings. The second fitting half 66 has a tubular body 78 into which a cylinder 80 is formed having a bore 82. An end 84 of the cylinder 80 is tapered to provide a stop. A retainer ring 86 having an annular shaped stop portion 88 is threadingly secured to the end of the tubular body 78 with the stop portion 88 extending adjacent to the bore 82 of the cylinder 80. The first fitting half 64 is telescopically extensible from within the second fitting half 66 until the enlarged diameter portion of the profile 70 engages the annular shaped stop portion 88 of the retainer ring 86. The first fitting half 64 is rotatably moveable relative to the second fitting half 66. The seal members 76 seal between the profile 70 of the tubular body 68 of the first fitting half 64 and the bore 82 into the tubular body 78 of the second fitting half 66. In some embodiments, the seal glands 74 and the seal members 76 may be disposed in the retainer ring 86 for sealingly engaging against the exterior profile 70. The first fitting half 64 and the second fitting half 66 each include a central passage 28 having a profile 30, similar to that discussed above for the fitting 12. The central passages 28 have annular shaped seal members 40 which coaxially extended circumferentially around central axis 18.

Figure 5:
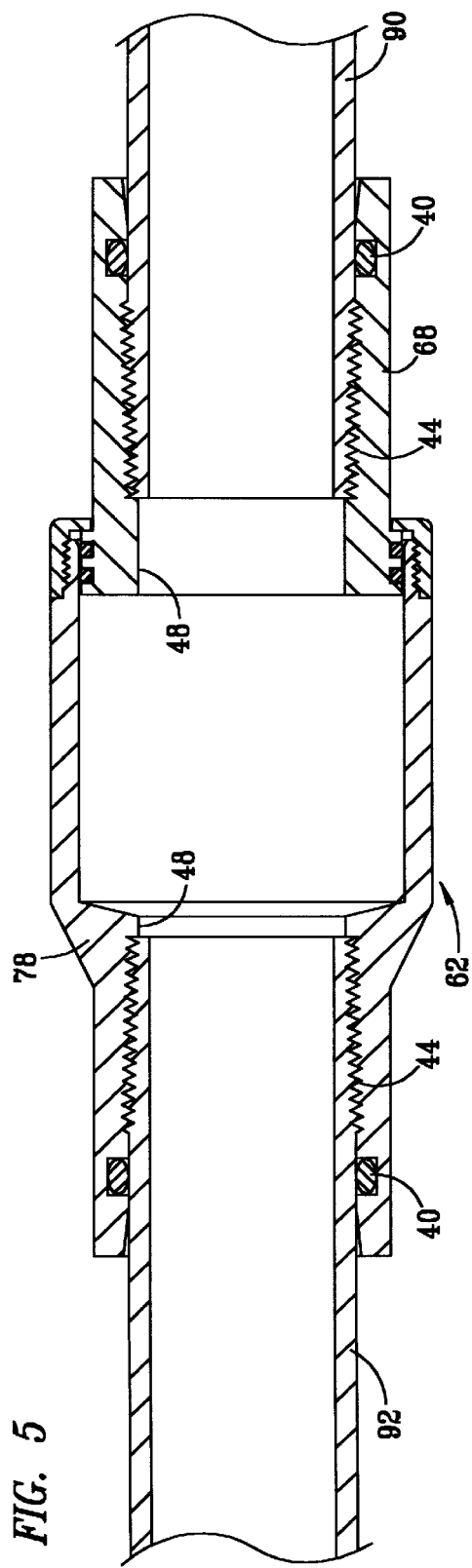
FIG. 5 is a longitudinal section view of the telescoping grip coupling fitting after being secured to the two tubular conduit ends.

Referring now to FIG. 5, there is illustrated a longitudinal section view of telescopically adjustable grip coupling fitting 62, and two end sections of respective ones of a conduit 90 and a conduit 92. The peripheral exterior surfaces of the conduits 90 and 92 are each smooth prior to insertion into the fitting 62. The profiles 30 of the first and second fitting halves 64 and 66 will round the end sections of the conduits 90 and 92, such that the O-rings 40 will sealingly engage against the smooth peripheral exterior surfaces of the conduits 90 and 92. The threaded sections 44 of the fitting halves 64 and 66 will score the smooth peripheral exterior surfaces of the conduits 90 and 92 to form grooves in which the threaded sections 44 will grippingly engage the conduits 90 and 92. The first and second fitting halves 64 and 66 are respectively rotated, one at a time, to first secure the first fitting half 64 to the conduit 90, and then secondly to rotate the second fitting half 66, as the first fitting half 64 remains stationary upon the conduit 90, to secure the conduit 92 within the second fitting half 66. Rotation of the respective ones of the first and second fitting halves 64 and 66 will pull the conduits 90 and 92, respectively, into the interiors of the tubular bodies 68 and 78 of the fitting 62 until the stops 48 are encountered. The threaded sections 44 of the first and second fitting halves 64 and 66 have right-hand threads and are inwardly tapered, such that they narrow in an inward direction.

Referring now to FIGS. 6 through 10, there are illustrated schematic diagrams depicting use of the telescopically extensible grip coupling fitting 62 for removing a damaged section of conduit and then joining two conduit sections 90 and 92 together. FIG. 6 depicts using the fitting 62 to measure and then cutting a length of damaged section of tubular conduit for removal from between the first and second conduit sections 90 and 92. The first fitting half 64 is shown after being extended from within the second fitting half 66. FIG. 7 depicts the first conduit section 90 after being moved to a position which is located to the side of a position in which the first conduit section is lineally aligned with the second conduit half 92, and after the first fitting half 64 is secured to the end section of the conduit 90. The first fitting half 64 is rotated around the periphery of the first conduit section 90 to draw the conduit 90 within the first fitting half 64, with the first fitting half 64 moving over the end of the conduit 90. FIG. 8 depicts the second conduit half 66 being moved to extend over the first conduit half 64 such that the terminal end of the conduit section 92 may be aligned with the terminal end of the second fitting half 66. FIG. 9 depicts the second fitting half 66 after it is lineally aligned with the tubular conduit 92, and shows the first fitting half 64 disposed within the second fitting half 66. FIG. 10 depicts the first and second fitting halves 64 and 66 of the telescoping grip coupling fitting 62 after the conduit section 92 has been pulled fully within the second fitting half 66 such that the fitting 62 grippingly and sealingly engages the two conduits 90 and 92.

Figure 11:
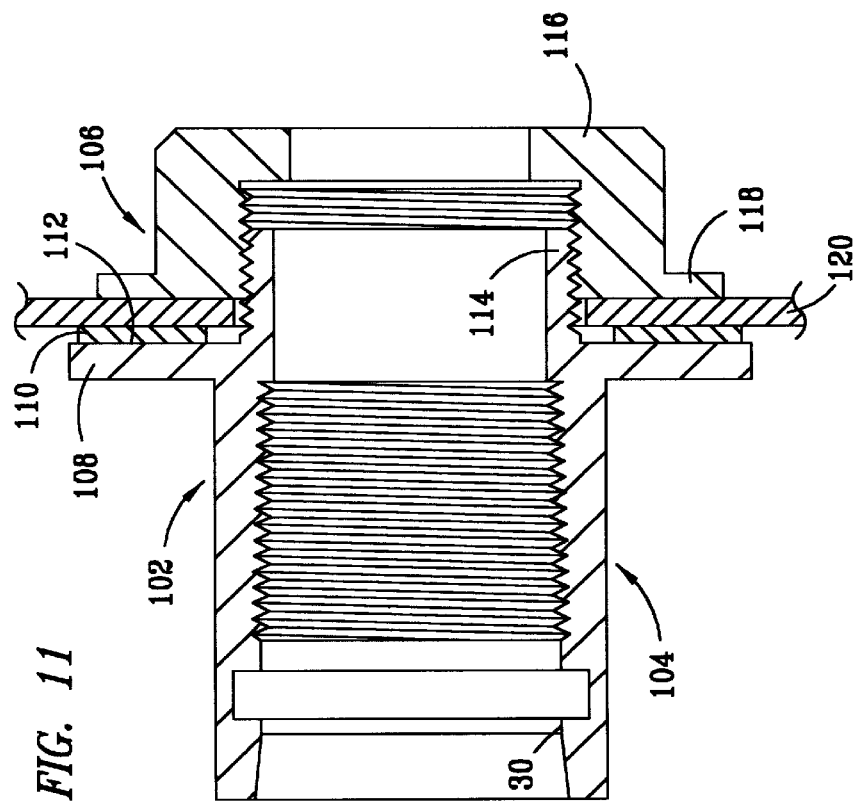
FIG. 11 is a longitudinal section view of a bulkhead grip coupling fitting.

Referring now to FIG. 11, there is illustrated a longitudinal section view of a bulkhead grip coupling fitting 102 made. The bulkhead grip coupling fitting 102 has a first fitting half 104 and a second fitting half 106. The first fitting half 104 has the profile 30 discussed above in reference to the grip coupling fitting 12. The second fitting half 106 is a bulkhead fitting which includes an outwardly extending flange 108 and a gasket 110, which fits against an annular seal face 112 of the flange 108. The second fitting half 106 further includes a threaded tubular section 114 for coupling to a gland nut 116. The threaded tubular section 114 of the second fitting half 106 is extended through a bulkhead wall 120 with the gasket 110 disposed between the annular seal face 112 and the outer surface of the wall 120. The gland nut 116 is then threadingly secured to the threaded tubular portion 114 such that an annular flange portion 118 of the gland nut 116 will press against the interior surface of the wall 120 and squeeze the gasket 110 between the seal face 112 of the flange portion 108 and an exterior surface of the wall 120.

Figure 12:
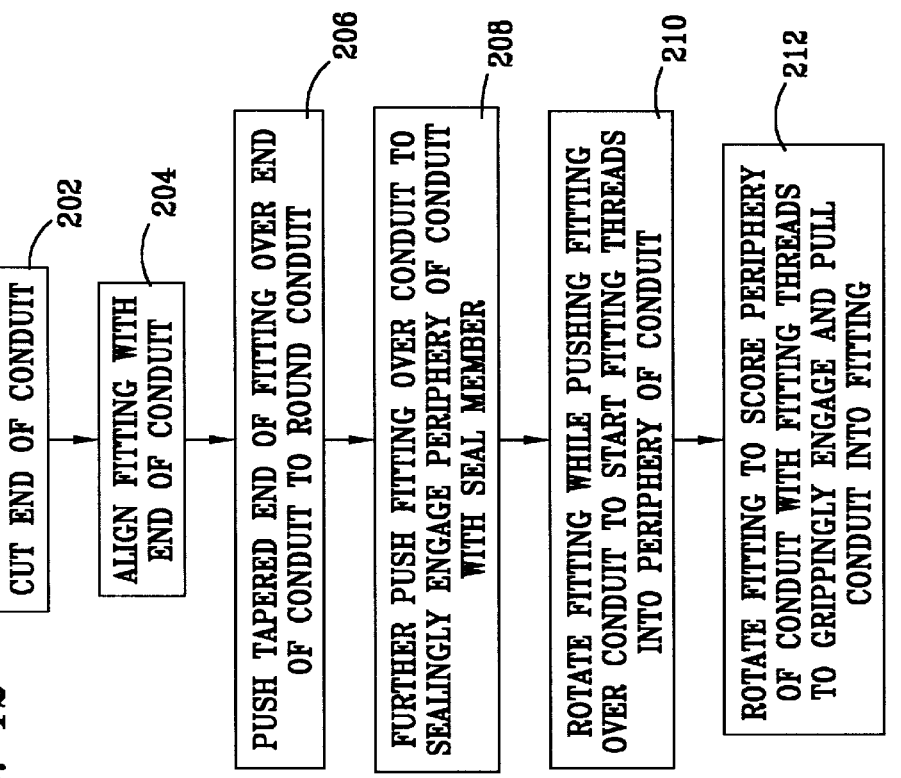
FIG. 12 is a flow chart which depicts a method for using a grip coupling fitting end.

Referring now to FIG. 12, there is illustrated a flow chart which depicts use of a grip coupling fitting 12. A block 202 depicts the step of cutting the end of a conduit, such as the conduit 14, for placing within a fitting, such as the fitting 12. A block 204 depicts the next step of aligning the fitting 12 with the end of the conduit 14. A block 206 depicts the next step of pushing the tapered end 32 of the fitting 12 over the end 50 of the conduit 14 to round the end section of conduit 14. A block 208 depicts the next step of further pushing the fitting 12 of the conduit 14 into the fitting 12 to sealingly engage the smooth periphery 24 of the conduit 14 with the seal member 40. A block 210 depicts the next step of rotating the fitting 12 while pushing the fitting 12 over the conduit 14 to start the threads of the threaded section 44 into the periphery 24 of the conduit 14. A block 212 depicts the next step of rotating the fitting 12 to score the periphery 24 of the conduit 14 with the threads of the threaded section 44 to grippingly engage and pull the conduit 14 into the fitting 12.

Figure 13:
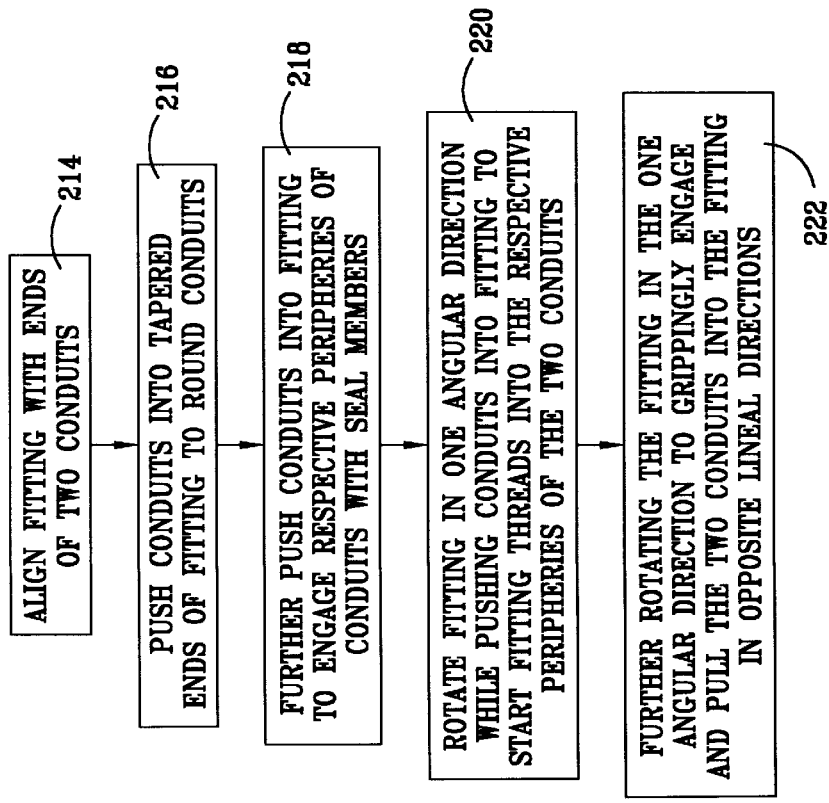
FIG. 13 is a flow chart which depicts a method for utilizing a grip coupling fitting.

Referring now to FIG. 13, there is illustrated a flow chart which depicts a method of utilizing a grip coupling fitting 12 to join the ends of two conduits 14 and 16. A block 214 depicts the step of aligning the end of the fitting 12 with the two ends 50 and 52 of respective ones of the tubular conduits 14 and 16. A block 216 depicts the next step of pushing the two ends 50 and 52 of the conduits 14 and 16 into the two tapered ends 32 of the opposite sides of the fitting 12 to round the end sections of the conduits 14 and 16. A block 218 depicts the next step of further pushing the conduits 14 and 16 into the fitting 12 to engage respective ones of the conduit exterior peripheries 24 and 26 with the seal members 40 of the respective ends of the fitting 12. A block 220 depicts the next step of rotating the fitting 12 in one angular direction, preferably a right-hand direction, while pushing the conduits 14 and 16 into the fitting 12 to start the fitting threads into respective ones of the two peripheries 24 and 26 of the tubular conduits 14 and 16. A block 222 depicts the next step of further rotating the fitting 12 in the one, singular angular direction to grippingly engage and then pull the two conduits 14 and 16 into the fitting 12 in opposite lineal directions.

Figure 14A:
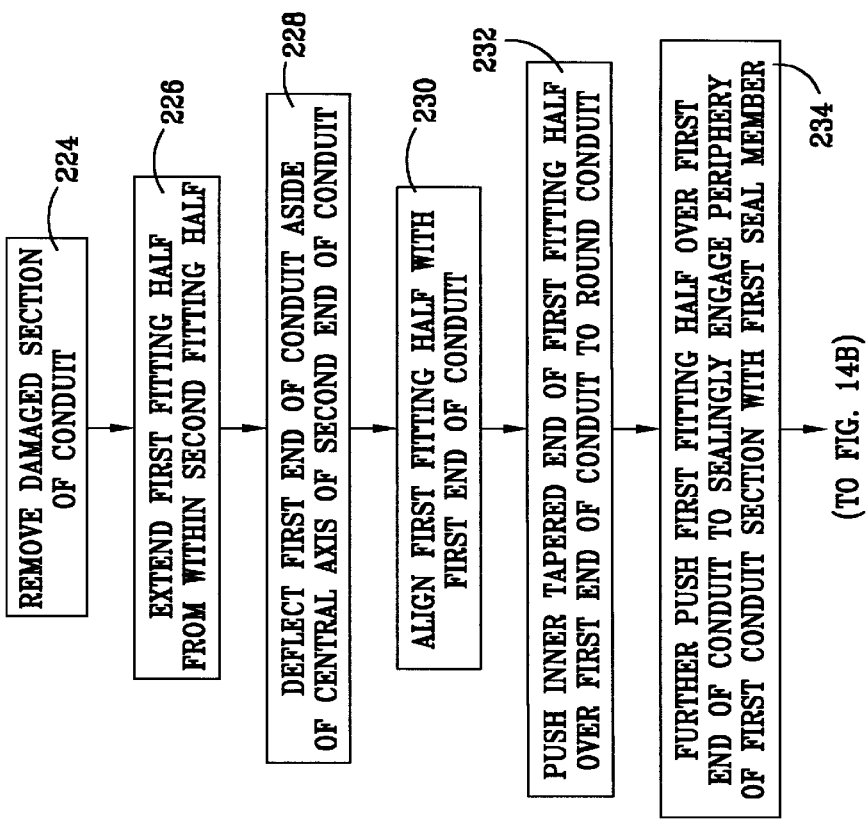

Referring now to FIGS. 14A and 14B, there is illustrated a flow chart which depicts a method for utilizing the telescopically extensible grip coupling fitting 62 to repair a damaged section of tubular conduit. A block 224 depicts the step of removing a damaged section of conduit from between the two conduit sections 90 and 92, shown in FIG. 6. A block 226 depicts the next step of extending the first fitting half 64 from within the second fitting half 66, as shown in FIG. 7. A block 228 depicts the next step of deflecting a first end of the conduit 90 aside of a central axis of the second end of the conduit 92. A block 230 depicts the next step of aligning the first fitting half 64 with the first end of the conduit 90. A block 232 depicts the next step of pushing the inwardly tapered end of the first fitting half 64 for over the first end of the conduit 90 to round the end of the conduit 90. A block 234 depicts the next step of further pushing the fitting half 64 over the first end of the conduit 90 to sealingly engage the periphery of the first conduit 90 with the first seal member 40 of the first fitting half 64. A block 236 depicts the next step of rotating the first fitting half 64 while pushing the first fitting 64 toward the first conduit section 90 to start the threads of the threaded section 44 of the first fitting half 64 into the exterior periphery of the first conduit section 90. A block 238 depicts the next step of rotating the first fitting half 64 to score the exterior periphery of the first conduit section 90 with the threads of the first fitting half 64 to grippingly engage and pull the first conduit section 90 into the first fitting half 64.

A block 240 depicts the next step of retracting the first fitting half 64 into the second fitting half 66, as shown in FIG. 8. A block 242 depicts the next step of aligning the end of the second fitting half 66 with the end of the conduit section 92. A block 244 depicts the next step of pushing the tapered end of the second fitting half 66 over the end of the conduit section 92 to round the conduit section 92 as shown in FIG. 9. A block 246 depicts the next step of further pushing the second fitting half 66 over the second end of the conduit 92 to sealingly engage the periphery of the second conduit section 92 with the seal member 40 of the second fitting half 66. A block 248 depicts the next step of rotating the second fitting half 66 relative to the conduit section 92, the first fitting half 64 and the first conduit section 90, while pushing the second fitting half 66 over the conduit section 92 to start the threads of the threaded section 44 of the second fitting half 66 into the exterior periphery of the conduit section 92. A block 250 depicts the next step of rotating a second fitting half 66 to score the exterior periphery of the conduit section 90 with the threads of the threaded section 44 of the second fitting half 66 to grippingly engage and then pull the conduit section 92 into the second fitting half 66, with the second fitting half 66 telescopically extending from the first fitting half 64.

Figure 15:
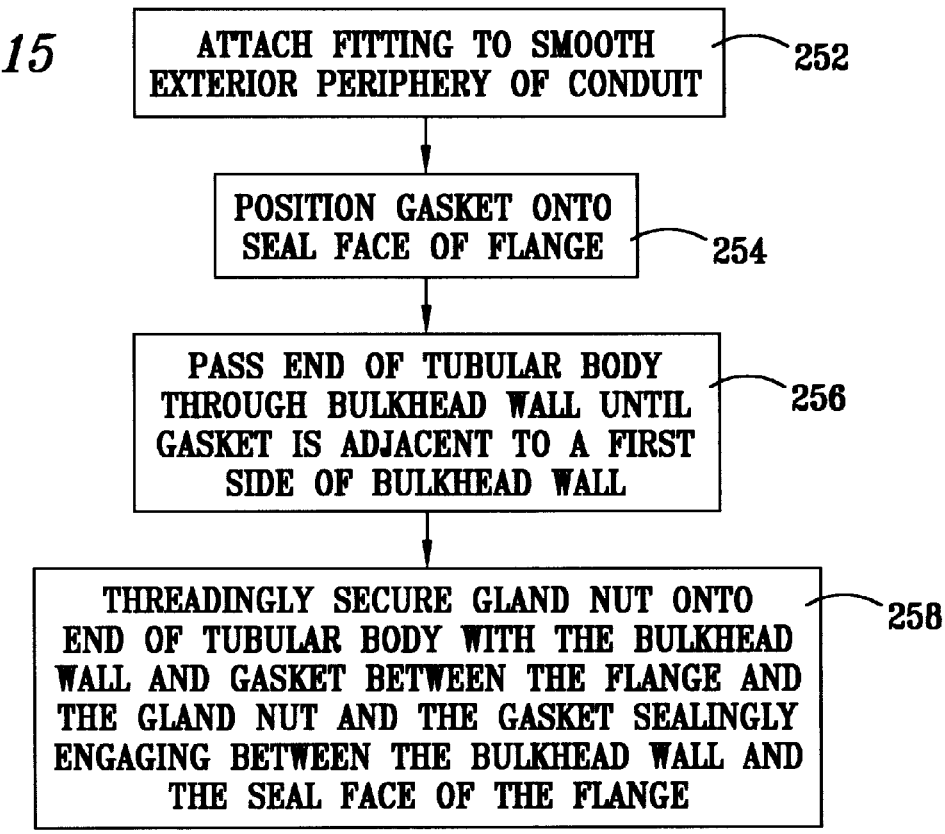
FIG. 15 is a flow chart which depicts a method for utilizing the bulkhead grip coupling fitting.

A FIG. 15 illustrates a flow chart which depicts a method for using the bulkhead grip coupling fitting 102. A block 252 depicts the step of attaching the fitting 102 to a smooth exterior periphery of a conduit, such as that described above in reference to the block 202 through the block 212 of FIG. 12. A block 254 depicts a step of positioning the gasket 110 onto the seal face 112 of the flange portion 118 of the fitting 102. A block 256 depicts the next step of extending the exteriorly threaded end portion 114 of the fitting 102 through a bulkhead wall 120 until the gasket 110 is adjacent to a first side of the bulkhead wall 110. A block 258 depicts a step of threadingly securing the gland nut 116 to the exteriorly threaded section 114 of the bulkhead fitting 102 until the gasket 110 is squeezed to sealingly engage between an outer surface of the bulkhead wall 120 and the seal face 112 of the flange portion 118. The gland nut 116 is tightened to rigidly secure the fitting 102 to the bulkhead wall 120.

The grip coupling of the present invention includes a grip coupling fitting which does not require preparation of the end sections of the tubular conduits, but rather will secure to the smooth peripheral exterior surface of a tubular conduit and provide a full bore opening between two tubular conduits. The grip coupling fitting has a tapered entrance section with narrows in an interior direction to round oval tubular conduit end sections such that a seal member which is interiorly disposed within the grip coupling fitting will sealingly engage against the exterior surface of the end sections of the tubular conduits. An interiorly tapered threaded section will then score the exterior periphery of the tubular conduits to grippingly engage and then pull the tubular conduits interiorly within the threaded section. In one embodiment of the present invention, a grip coupling is provided which couples two ends of tubular conduits together. The coupling fitting has two opposite ends having threaded sections of opposite-hand rotation such that the rotation of the fitting in one angular direction will draw the two tubular conduits inward into the grip coupling fitting in opposite lineal directions. A telescopically extensible grip coupling fitting is also provided having first and second fitting halves for joining the two end sections of a tubular conduit after a damaged conduit section is removed from between the two end sections. The telescopically extensible grip coupling may be joined to the two end sections without requiring extensive movement of the two conduit end sections. Further, a bulkhead grip coupling fitting is provided for coupling to and sealingly engaging the smooth exterior surface of a tubular conduit. A second coupling half of the bulkhead grip coupling fitting sealingly engages and secures to a bulkhead wall.

Although the preferred embodiment and several alternative embodiments have been described in detail, it should be understood that various changes, substitutions and alterations can be made therein without departing from the spirit and scope of the invention as defined by the appended claims.

What is claimed is:

1. A fitting for a tubular conduit, comprising:

a tubular body having a central passage for receiving the tubular conduit, said central passage defining a central axis and having a tapered opening, a threaded section and a seal section which extend about said central axis;

a seal member which extends from said seal section for sealingly engaging an exterior periphery of the tubular conduit;

said seal section and said seal member being disposed between said tapered opening and said threaded section of said central passage, and said threaded section having crests which extend with edges for scoring the exterior periphery of the tubular conduit, wherein said crests of said threaded section will grippingly engage within the tubular conduit to pull said tubular conduit further within said central passage when said fitting is rotated in a first angular direction about said central axis and relative to the tubular conduit; and wherein a section of the tubular conduit is disposed within said central passage, with said tapered opening rounding the exterior periphery of the tubular conduit, said seal member extending from said seal section and engaging the exterior periphery of the tubular conduit and said threaded section extending through the exterior periphery and into the tubular conduit to retain the tubular conduit within said fitting.

2. The fitting of claim 1, wherein said seal section defines a seal gland and said seal member is disposed within said gland for extending therefrom to sealingly engage a portion of the exterior periphery of the tubular conduit which is adjacent to an outward end portion of the tubular conduit having the exterior periphery which is scored by said crests of said threaded section of the tubular conduit.

3. The fitting of claim 1, said threaded section of said central passage is inwardly tapered such that an interior diameter of said central passage defined by said crests of said threaded section narrows in an inward direction into said fitting.

4. The fitting of claim 1, wherein said seal member is an annular protuberance which is integrally formed as a singular member with said seal section of said central passage of said tubular body.

5. The fitting of claim 1, wherein a stop for preventing advancement of the tubular conduit into said fitting is provided by said threaded section being inwardly tapered, such that the tubular conduit will not extend substantially beyond a selected distance into said central passage.

6. The fitting of claim 1, wherein:
said fitting further comprises a coupling having a first and second fitting halves;
the tubular conduit comprises a first tubular conduit for joining to said first fitting half;
said second fitting half is rigidly joined to said first fitting half and disposed relative to said first fitting half for receiving a second tubular conduit;
said first fitting half comprises said tapered opening, said threaded section, said seal section and said seal member;
said second fitting half comprises a second tapered opening, a second threaded section, a second seal section and a second seal member, which circumferentially extend coaxially about said central axis, spaced apart from said first fitting halve, for receiving a second tubular conduit;
said second seal section and said second seal member are disposed between said second tapered opening and said second threaded section of said second fitting half;
said second threaded section has second crests which extend with second edges for scoring an outer periphery of the second tubular conduit, wherein said second threaded section has threads of an opposite-hand to said threaded section of said first fitting half such that said second crests of said second threaded section will grippingly engage within the second tubular conduit to pull the second tubular conduit further within said central passage, in an opposite lineal direction to that which the first tubular conduit is pulled into said central passage and said first fitting half, when said fitting is rotated in said first angular direction about said central axis and relative to the first and second tubular conduits; and
an unthreaded section of the second tubular conduit is disposed within said second fitting half, with said second tapered opening rounding the outer periphery of the second tubular conduit, said second seal member extending from said second seal section and engaging the outer periphery of the second tubular conduit, and said second threaded section extending through the outer periphery and into the second tubular conduit to retain the second tubular conduit within second fitting half of said fitting.

7. The fitting of claim 1, wherein:
said fitting further comprises a coupling having a first and second fitting halves, said tubular body of said first fitting half comprises a first tubular body and said second fitting half comprises a second tubular body which is slidably joined to said first tubular body of said first fitting half for sliding in a lineal relation relative to said first fitting half, and said second fitting half is disposed relative to said first fitting half for receiving a second tubular conduit;
the tubular conduit comprises a first tubular conduit for joining to said first fitting half;
said first fitting half comprises said tapered opening, said threaded section, said seal section and said seal member;
said second fitting half comprises a second tapered opening, a second threaded section, a second seal section and a second seal member, which circumferentially extend coaxially about said central axis of said fitting, spaced apart from said first fitting half for receiving a second tubular conduit;
said second seal section and said second seal member are disposed between said second tapered opening and said second threaded section of said central passage;
said second threaded section has second crests which extend with second edges for scoring an outer periphery of the second tubular conduit, wherein said second crests of said second threaded section will grippingly engage within the second tubular conduit to pull the second tubular conduit further within said central passage, in an opposite lineal direction to that which the first tubular conduit is pulled into said central passage and said first fitting half, when said second fitting half is rotated about said central axis and relative to the second tubular conduit;
an unthreaded section of the second tubular conduit is disposed within said central passage, with said second tapered opening rounding the outer periphery of the second tubular conduit, said second seal member extending from said second seal section and engaging the outer periphery of the second tubular conduit and said second threaded section extending through the outer periphery and into the second tubular conduit to retain the second tubular conduit within said second fitting half of said fitting;
said first and second tubular conduits remain stationary, and said first and second fitting halves rotate relative to respective ones of said first and second tubular conduits to extend over the respective ones of the first and second tubular conduits; and
said fitting further includes an intermediate sealing member sealingly engaging therebetween said first and second fitting halves.

8. The fitting of claim 7, further comprising:
said first tubular body having a chamber formed into second end thereof, opposite of said tapered opening and said threaded section of said first fitting half;
said second tubular body having an exterior profile for fitting within said chamber and slidably extending therefrom in said lineal relation;
a retainer member mounted to said first tubular body to extend on said second end of said first tubular body for retaining at least part of said second tubular body within said chamber of said first tubular body when said second tubular body is in a fully extended position relative to said first tubular body; and
said intermediate sealing member extending between said second tubular body and one of said first tubular body and said retainer member for sealingly engaging between said exterior profile of said second tubular body and said one of said first tubular body and said retainer member.

9. The fitting of claim 1, wherein said fitting further includes a bulk head fitting which comprises:
an annular flange portion which extends from said tubular body, in a direction which is radially outward from said central axis, said annular flange portion defining a seal face which faces in a direction that is substantially perpendicular to said central axis;
an annular seal member for fitting against said seal face of said annular flange and sealing against a bulk head wall; and
a gland nut for securing to said tubular body with said bulk head wall disposed between said gland nut and said annular seal member, wherein said annular seal member is disposed between said seal face of said annular flange portion and said bulk head wall for sealingly engaging therebetween.

10. The fitting of claim 9, wherein said gland nut is threadingly secured to said tubular body.

11. A fitting for a tubular conduit, said fitting having a tubular body which includes a central passage for receiving the tubular conduit, said fitting comprising:
a central axis defined by said central passage into said tubular body;
a tapered opening into said central passage, said tapered opening being sized for receiving an end of the tubular conduit which is oval and rounding the end of the tubular conduit for fitting within said central passage;
a seal gland formed into said central passage, said seal gland being disposed adjacent to and inward of said tapered opening;
a seal member disposed within said seal gland and extending from said seal gland for sealingly engaging the smooth exterior periphery of the tubular conduit;
a threaded section of said central passaged being disposed inward of said seal gland, said threaded section being tapered in an inward direction into said central passage such that interior diameters of said central passages which are defined by crests of said threaded section narrow in an inward direction extending from said tapered opening into said fitting; and
wherein said crests of said threaded section are formed such that said crests have edges for scoring the smooth exterior periphery of the tubular conduit to grippingly engage within the tubular conduit and to pull said tubular conduit further within said central passage when said fitting is rotated in a first angular direction about said central axis and relative to the tubular conduit.

12. The fitting of claim 11, wherein:
said fitting further comprises a coupling having a first and second fitting halves;
the tubular conduit comprises a first tubular conduit for joining to said first fitting half;
said second fitting half is rigidly joined to said first fitting half and disposed relative to said first fitting half for receiving a second tubular conduit;
said first fitting half comprises said tapered opening, said threaded section, said seal section and said seal member;
said second fitting half comprises a second tapered opening, a second threaded section, a second seal section and a second seal member, which circumferentially extend coaxially about said central axis, spaced apart from said first fitting halve, for receiving a second tubular conduit;
said second seal section and said second seal member are disposed between said second tapered opening and said second threaded section of said second fitting half;
said second threaded section is inwardly tapered and has second crests which extend with second edges for scoring an outer periphery of the second tubular conduit, wherein said second threaded section has threads of an opposite-hand to said threaded section of said first fitting half such that said second crests of said second threaded section will grippingly engage within the second tubular conduit to pull the second tubular conduit further within said central passage, in an opposite lineal direction to that which the first tubular conduit is pulled into said central passage and said first fitting half, when said fitting is rotated in said first angular direction about said central axis and relative to the first and second tubular conduits; and
a smooth outer periphery of the second tubular conduit is disposed within said second fitting half, with said second tapered opening rounding the smooth outer periphery of the second tubular conduit, said second seal member extending from said second seal section and engaging the smooth outer periphery of the second tubular conduit, and said second threaded section extending through the smooth outer periphery and into the second tubular conduit to retain the second tubular conduit within second fitting half of said fitting.

13. The fitting of claim 11, wherein:
said fitting further comprises a coupling having a first and second fitting halves, said tubular body of said first fitting half comprises a first tubular body and said second fitting half comprises a second tubular body which is slidably joined to said first tubular body of said first fitting half for sliding in a lineal relation relative to said first fitting half, and said second fitting half is disposed relative to said first fitting half for receiving a second tubular conduit;
the tubular conduit comprises a first tubular conduit for joining to said first fitting half;
said first fitting half comprises said tapered opening, said threaded section, said seal section and said seal member;
said second fitting half comprises a second tapered opening, a second threaded section, a second seal section and a second seal member, which circumferentially extend about said central axis of said fitting, spaced apart from said first fitting half for receiving a second tubular conduit;
said second seal section and said second seal member are disposed between said second tapered opening and said second threaded section of said central passage;
said second threaded section is inwardly tapered and has second crests which extend with second edges for scoring an outer periphery of the second tubular conduit, wherein said second crests of said second threaded section score said smooth outer periphery of the second tubular conduit to grippingly engage within the second tubular conduit and pull the second tubular conduit further within said central passage, in an opposite lineal direction to that which the first tubular conduit is pulled into said central passage and said first fitting half, when said second fitting half is rotated about said central axis and relative to the second tubular conduit;

said first and second tubular conduits remain stationary, and said first and second fitting halves rotate relative to respective ones of said first and second tubular conduits to extend over the respective ones of the first and second tubular conduits; and said fitting further includes an intermediate sealing member sealingly engaging therebetween said first and second fitting halves.

14. The fitting of claim 13, further comprising:

said first tubular body having a chamber formed into second end thereof, opposite of said tapered opening and said threaded section of said first fitting half;

said second tubular body having an exterior profile for fitting within said chamber and slidably extending therefrom in said lineal relation;

a retainer member mounted to said first tubular body to extend on said second end of said first tubular body for retaining at least part of said second tubular body within said chamber of said first tubular body when said second tubular body is in a fully extended position relative to said first tubular body; and said intermediate sealing member extending between said second tubular body and said first tubular body for sealingly engaging between said exterior profile of said second tubular body and said one of said first tubular body and said retainer member.

15. The fitting of claim 11, wherein said fitting further includes a bulk head fitting which comprises:

an annular flange portion which extends from said tubular body, in a direction which is radially outward from said central axis, said annular flange portion defining a seal face which faces in a direction that is substantially perpendicular to said central axis;

an annular seal member for fitting against said seal face of said annular flange and sealing against a bulk head wall; and a gland nut for securing to said tubular body with said bulk head wall disposed between said gland nut and said annular seal member, wherein said annular seal member is disposed between said seal face of said annular flange portion and said bulk head wall for sealingly engaging therebetween.

16. A method for connecting a fitting to a tubular conduit, the method comprising the steps of:

providing a fitting having a tubular body into which a central passage extends, the central passage including a tapered entrance opening, a seal section and a threaded section;

rounding an end of a first tubular conduit by pushing the end of the first tubular conduit into the tapered entrance opening of the fitting;

sealingly engaging an exterior periphery of the first tubular conduit with a seal member which extends from the seal section, wherein the end of the first tubular conduit is pushed further into the central passage and beyond the tapered entrance opening to press the seal member against the first tubular conduit;

scoring the exterior periphery of the first tubular conduit with the threaded section by turning the fitting in a first angular direction as the end of the first tubular conduit is pushed past the seal member and further into the central passage of the tubular body to engage the crests of the threaded section of the central passage; and turning the tubular body to score the exterior periphery of the first tubular conduit and draw the first tubular conduit further into the tubular body to grippingly and sealingly engage the first tubular conduit with the fitting.

17. The method of claim 16, further comprising the steps of:

providing the fitting with a second fitting portion which is secured to the tubular body, and which includes a second tapered entrance opening, a second seal section and a second threaded section;

rounding an end portion of a second tubular conduit by pushing the end portion of the second tubular conduit into the second tapered entrance opening of the fitting, which is in a lineal direction which is opposite to a lineal direction in which the end of the first tubular conduit is pushed into the tubular body of the fitting;

sealingly engaging an outer periphery of the end portion of the second tubular conduit with a second seal member which extends from the second seal section, wherein the end portion of the second tubular conduit is pushed further into the fitting and beyond the second tapered entrance opening to press the second seal member against the second tubular conduit;

scoring the outer periphery of the second tubular conduit with the threaded section by rotating the second fitting portion relative to the second tubular conduit as the end portion of the second tubular conduit is pushed past the second seal member and further into the second fitting portion to engage crests of the second threaded section within the outer periphery of the second tubular conduit; and further rotating the second fitting portion relative to the second tubular conduit to score the outer periphery of the second tubular conduit and draw the second tubular conduit further into the tubular body to grippingly and sealingly engage the second tubular conduit with the second fitting half.

18. The method of claim 17, wherein the second fitting portion is rigidly secured to the tubular body of the fitting, and the first threaded section is threaded with an opposite hand thread to that of the second threaded section such that rotation of the tubular body of the fitting and the second fitting portion in the first angular direction relative to the first and second tubular conduits will simultaneously score both the exterior periphery of the first tubular conduit and the outer periphery of the second tubular conduit to grippingly engage the first and second tubular conduits and pull the first and second tubular conduits into the fitting in opposite lineal directions.

19. The method of claim 17, wherein the second fitting portion is slidably secured to the tubular body of the fitting for moving in a lineal direction relative to the tubular body which is parallel to a central axis of the fitting, and rotating relative to the tubular body and around the central axis, the method further comprising the steps of:

lineally extending the second fitting portion relative to the tubular body, and then performing the steps of rounding an end portion of a second tubular conduit, sealingly engaging an outer periphery of the end portion of the second tubular conduit, scoring the outer periphery of the second tubular conduit, and further rotating the second fitting portion relative to the second tubular conduit;

lineally retracting the second fitting portion relative to the tubular body;

aligning the tapered entrance opening of the tubular body with the end of the first tubular conduit, and then performing the steps of rounding an end of a first tubular conduit, sealingly engaging an exterior periphery of the first tubular conduit, scoring the exterior periphery of the first tubular conduit, and turning the tubular body to further score the exterior periphery of the first tubular conduit; and wherein the tubular body of the fitting will extend from and rotate relative to the second fitting portion as the first tubular conduit is further scored and pulled into the central passage of the tubular body of the fitting.

20. The method of claim 17, further comprising the steps of:

providing the fitting with a bulkhead fitting portion, at least a portion of which is rigidly secured to the tubular body of the fitting; and after the steps of grippingly securing the first tubular conduit to the tubular body of the fitting, securing the bulkhead fitting portion to a wall.

* * * * *